US008307343B2

(12) United States Patent  
Chaudhuri et al.

(10) Patent No.: US 8,307,343 B2  
(45) Date of Patent: Nov. 6, 2012

(54) APPLICATION AND DATABASE CONTEXT CORRELATION FOR DATABASE APPLICATION DEVELOPERS

(75) Inventors: Surajit Chaudhuri, Redmond, WA (US); Vivek R. Narasayya, Redmond, WA (US); Manoj A. Symala, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1395 days.

(21) Appl. No.: 11/875,616

(22) Filed: Oct. 19, 2007

(65) Prior Publication Data

US 2009/0106746 A1    Apr. 23, 2009

(51) Int. Cl.  
 G06F 9/44 (2006.01)  
 G06F 7/00 (2006.01)  
 G06F 17/30 (2006.01)
(52) U.S. Cl. .................. 717/128; 707/713; 707/759
(58) Field of Classification Search .......... 717/128; 707/713, 759  
See application file for complete search history.

(56) References Cited

U.S. PATENT DOCUMENTS

| | | | |
|---|---|---|---|
| 5,561,763 A | 10/1996 | Eto et al. | |
| 5,734,885 A | 3/1998 | Agrawal et al. | |
| 5,918,224 A | 6/1999 | Bredenberg | |
| 6,026,391 A | 2/2000 | Osborn et al. | |
| 6,145,121 A * | 11/2000 | Levy et al. | 717/135 |
| 6,772,411 B2 * | 8/2004 | Hayes et al. | 717/127 |
| 6,795,832 B2 | 9/2004 | McGeorge et al. | |
| 6,801,914 B2 | 10/2004 | Barga et al. | |
| 7,010,517 B2 | 3/2006 | Bird et al. | |
| 8,108,350 B2 * | 1/2012 | Rohwedder et al. | 707/648 |
| 2005/0193264 A1 | 9/2005 | Khan et al. | |
| 2005/0198038 A1 | 9/2005 | Werner | |
| 2005/0262060 A1 * | 11/2005 | Rohwedder et al. | 707/3 |
| 2007/0016558 A1 * | 1/2007 | Bestgen et al. | 707/3 |
| 2008/0244531 A1 * | 10/2008 | Schmelter et al. | 717/128 |
| 2009/0006445 A1 * | 1/2009 | Shemenzon et al. | 707/102 |

OTHER PUBLICATIONS

Meier, JD, Srinath Vasireddy, Ashish Babbar, and Alex Mackman. "Microsoft (R) Patterns & Practices—Chapter 12—Improving ADO.NET Performance." Microsoft, May 2004. Chapter 12, as retrieved from msdn.microsoft.com on Dec. 6, 2011. pp. 1-45.*  
Chaudhuri, Surajit, Vivek Narasayya, and Manoj Syamala. "Bridging the Application and DBMS Profiling Divide for Database Application Developers." Sep. 23, 2007. ACM, VLDB '07. pp. 1252-1262.*  
"Symantec i3 for Microsoft .NET-Performance Management for .NET Applications" Symantec Corporation, 2006, pp. 1-4.  
Guo, et al., "A Survey of J2EE Application Performance Management Systems", Proceedings of the IEEE International Conference on Web Services, IEEE, 2004, pp. 8.

* cited by examiner

*Primary Examiner* — Insun Kang  
*Assistant Examiner* — Erika Kretzmer

(57) ABSTRACT

Infrastructure for capturing and correlating application context and database context for tuning, profiling and debugging tasks. The application context can include events such as data access events, and the database context can include events such as database server events. The events can be obtained from server tracing, data access layer tracing, and/or application tracing and written into respective log files. A data access event can indicate that an application consumed a row from a result set returned from a DBMS query. A post-processing step can correlate the application and database contexts by tokenizing strings and computing intersections between the tokenized strings. A tool inside a development environment may also suggest a query hint for the database or a data access API for the application based on the correlated context.

20 Claims, 15 Drawing Sheets

*— 700*

MatchEvents (S) // S is event stream obtained via ETW tracing of App and SQL Server ordered by TimeStamp
1. While (Events available in event stream)
2.   Parse the event stream and gather event type, thread id, user data (the SQL string)
3.     If the EventType is an App event
4.       Extract the SQL string that was issued, add to the current *thread context*. Add invoking function name.
5.     If the EventType is a SQL Server Event
6.       ServerString = Get the SQL string of the event
7.       For each thread context available
8.         For each event in the current thread context
9.           AppString = Get the SQL string of the event
10.          Score = GetApproximateMatchScore (ServerString, AppString)
11.          If (Score > MaxScore)
12.            MaxScore = Score MatchedThreadContext=CurrentThreadContext
13.          Output the App String with the highest score as the "match" for Server String and remove from the MatchedThreadContext

*FIG. 7*

APPLICATION AND DATABASE CONTEXT CORRELATION FOR DATABASE APPLICATION DEVELOPERS

BACKGROUND

Tools for profiling and tuning application code remain disconnected from the profiling and tuning tools for relational database management systems (RDBMSs). This presents a challenge for developers of database applications to profile, tune and debug applications, for example, identifying application code that causes deadlocks in the server. RDBMSs serve as the backend for many real-world data intensive applications. These applications can use programming interfaces such as ODBC (open database connectivity), JDBC (Java database connectivity), ADO.Net, and OLE DB (object linking and embedding database), for example, to interact with the database server.

When building these applications, application developers can use a variety of tools for understanding and fixing problems in the application. For example, development environments can provide profiling tools that allow developers to understand performance characteristics in the application code such as frequently invoked functions, time spent in a function, etc.

For database application developers, this support is not sufficient since APIs are used to invoke DBMS functionality. Thus, an important part of the application execution happens inside the DBMS. DBMSs provide profiling and tuning tools that give developers information about which SQL (structured query language) statements were executed against the server, the duration of each statement, reads and writes performed by the statement, blocking activity, etc.

However, the information obtained from the development environment profiler and the DBMS profiler remain as two islands of information that have little or no understanding of each other. This makes it difficult for database application developers to identify and fix problems with applications. This is illustrated in one example of detecting functions in the application code that caused a deadlock in the DBMS.

Consider an application that has two threads, each executing a task on behalf of a different user. Each thread invokes certain functions that invoke SQL statements that read from and write to a particular table T in the database. Consider a scenario where an intermittent bug in one of the threads causes SQL statements issued by the application to deadlock with one another on the server. The database server will detect the deadlock and terminate one of the statements and unblock the other. This is manifested in the application as one thread receiving an error from the server and the other thread running to completion as normal. Thus, while it is possible for the developer to know that there was a deadlock (by examining the DBMS profiler output or the server error message) it is difficult for the developer to know, for example, which function in each thread issued the respective statements that caused the server deadlock. Having the ability to identify the application code that is responsible for the problem in the database server can save considerable debugging effort for the developer.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Disclosed is an infrastructure that simultaneously captures and correlates both the application context as well as the database context, thereby enabling a rich class of tuning, profiling and debugging tasks. The infrastructure extends the DBMS and application profiling infrastructure. This integration makes it easy for a developer to invoke and interact with a tool from inside the development environment.

Three sources of information are employed when an application is executed: server tracing, data access layer tracing, and application tracing. The server tracing is can be a built-in profiling capability of the DBMS. Types of trace events that are exposed by the server for profiling include, for example, SQLStatementCompleted (an event that is generated whenever a SQL statement completes), and a Deadlock event (which is generated whenever the server identifies a deadlock and terminates a victim request). The data access layer tracing for APIs to connect and interact with the DBMS. This tracing contains detailed information about how the application uses the APIs. For example, an event is generated each time the application opens a connection, executes a statement, consumes a row from the result set etc. For application tracing, binary instrumentation techniques are employed to inject code into the application. When the application is run, the injected code emits certain events, for example, an event when a thread enters or leaves a function, or when the application enters or leaves a loop.

The events obtained from each of these sources are written into a log file. The log file receives log traces from different processes on a machine in a uniform manner to the same trace session. An event log is generated on each machine that involves either an application process or the DBMS server process. A post-processing step is performed over the event log(s) to correlate the application and database contexts. The output of post-processing is a single "view" where both the application and database profile of each statement issued by the application are exposed. This makes it possible to perform the application level debugging and tuning for SQL application developers.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

BRIEF DESCRIPTION OF THE DRAWINGS

FIG. 7 illustrates an exemplary algorithm for matching used by the log analyzer component.

DETAILED DESCRIPTION

Figure 1:
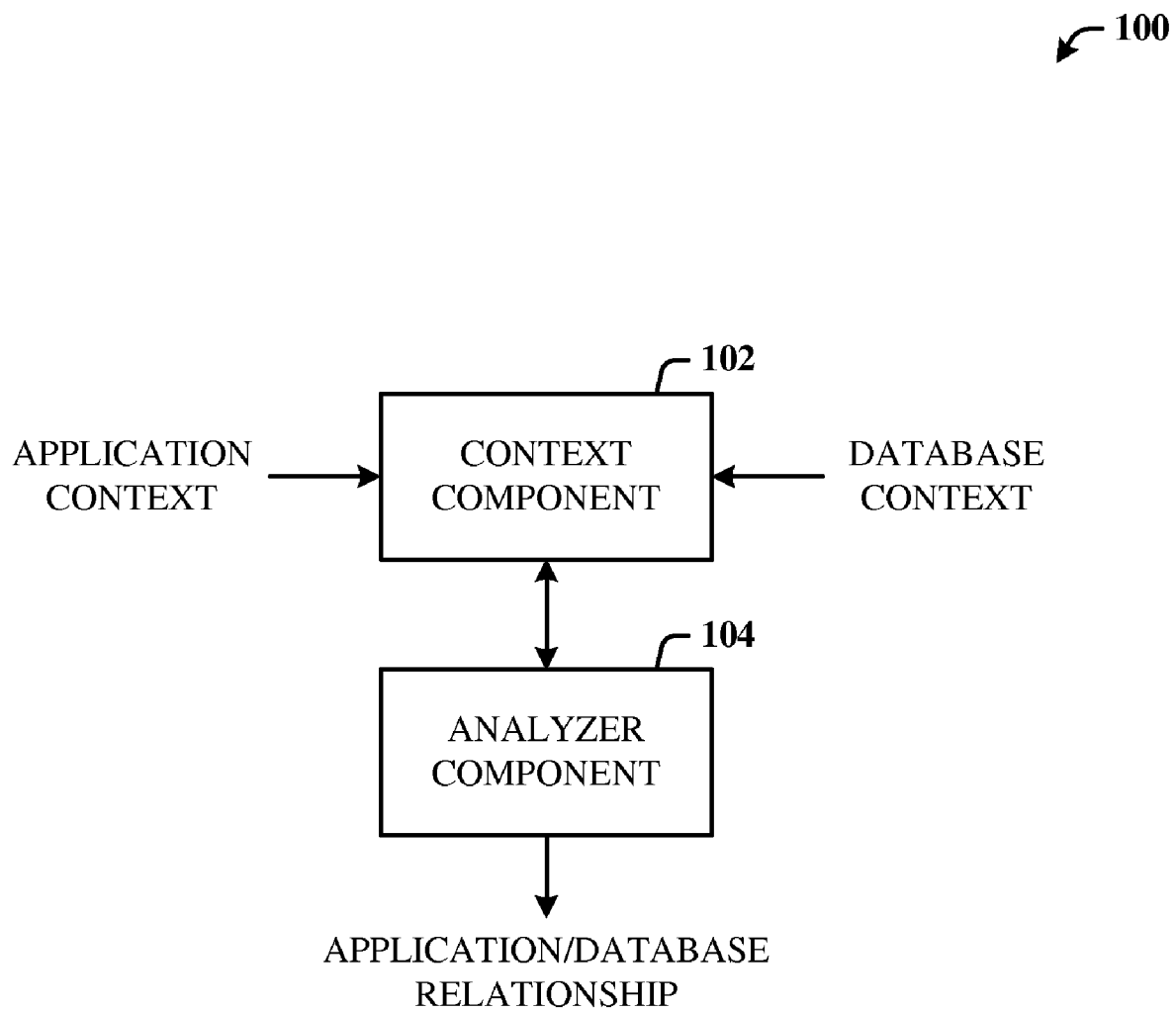
FIG. 1 illustrates a computer-implemented system for application development.

The disclosed architecture captures and correlates application context and database context for tuning, profiling and debugging tasks. The infrastructure extends the database management system (DBMS) and application profiling infrastructure making it easy for a developer to invoke and interact with a tool from inside the application development environment. Three sources of information are employed when an application is executed: server event tracing, data access layer event tracing, and application event tracing. The events obtained from each of these sources are written into a log file. An event log is generated on each machine that involves either an application process or the DBMS server process and the log file receives log traces from different processes on a machine to the same trace session. A post-processing step over the event log(s) correlates the application and database contexts. The output is a single view where both the application and database profile of each statement issued by the application are exposed.

In one embodiment, a tool using this infrastructure enables developers to seamlessly profile, tune and debug ADO.Net applications over Microsoft SQL Server by taking advantage of information across the application and database contexts.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates a computer-implemented system 100 for application development. The system 100 includes a context component 102 for obtaining context information of an application and a database (e.g., server) during a profiling session, and an analyzer component 104 for correlating the context information to facilitate presentation of a view of a profile of the application and the database during the profiling session.

The system 100 (and more detailed and alternative systems described infra) closes the gap that currently exists in profiling technologies for database application developers. The context of an application (e.g., threads, functions, loops, number of rows from a structured query language (SQL) query actually consumed by the application, etc.) and the context of the database server when executing a statement (e.g., duration of execution, duration for which the statement was blocked, number of rows returned, etc.) can now be correlated with each other.

Moreover, the developer/user can view the application and database functions in a single view during the development phase and interact in the form of queries, for example, thereby enabling a class of development, debugging and tuning tasks that are today difficult to achieve for application developers.

Figure 2:
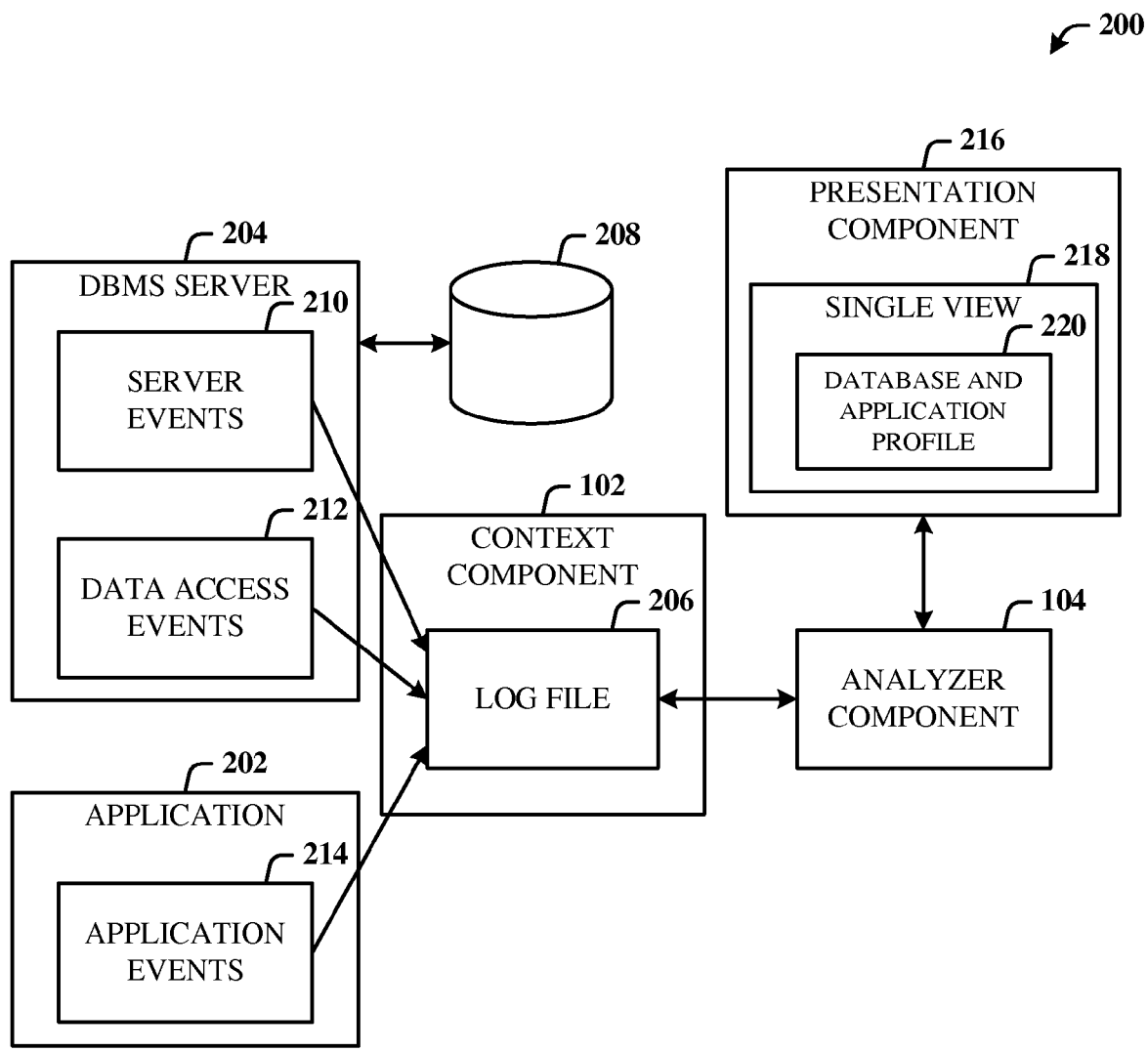
FIG. 2 illustrates a more detailed system for application and database development during a profiling session.

FIG. 2 illustrates a more detailed system 200 for application and database development during a profiling session. The user is developing an application 202 for use with a DBMS server 204. The system 200 includes the context component 102 and analyzer component 104. Here, the context component 102 is shown as including a log file 206 for receiving event information from at least three sources of context information, which are generated when the application 202 is launched to access data in a database 208 associated with the server DBMS 204.

A first source is server events 210. This can be a built-in profiling capability of the DBMS server 204. There are several types of server trace events 210 that are exposed by the server 204 for profiling. For example, SQLStatementCompleted is an event that is generated whenever a SQL statement completes. The SQLStatementCompleted event contains attributes such as the SQL text, duration of statement, reads, writes, rows returned by the statement, etc. Another example is a Deadlock event, which is generated whenever the server 204 identifies a deadlock and terminates a victim request. The Deadlock event contains attributes such as the text of the two deadlocking requests, which request was chosen as a victim, etc.

A second information source is data access events 212. This can be a built-in profiling capability of a data access layer (e.g., the ADO.Net). Since the application uses APIs (application program interfaces) to connect and interact with the DBMS server 204, these events contain detailed information about how the application 202 uses the APIs. For example, an event is generated each time the application 202 opens a connection, executes a statement, consumes a row from the result set, etc.

A third information source is application events 214 via application tracing. In support thereof, binary instrumentation techniques are employed to inject code into the application 202. Since binary instrumentation is a post-compilation step, access to the application source code is not required. When the application 202 is run, the injected code emits certain events. For example, the application 202 can be made to emit an event whenever a thread enters or leaves a function. The attributes of such an event can include the identifier of the function, timestamp of entry, timestamp of exit, etc. Another example of an event is whenever the application 202 enters or leaves a loop.

The system 200 includes a presentation component 216 for presenting a single (or consolidated) view 218 of the profile 220 of the application 202 and DBMS server 204 for each statement issued by the application 202.

In operation, the analyzer component 104 analyzes the event information in the log file 206 received from the sources (server events 210, data access events 212 and application events 214), performs matching as part of correlating the events information thereby facilitating the presentation of the database and application profile in the single view via the application development environment.

The context component 102, analyzer component 104 and presentation component 216, as well as the application 202 can be part of a client development tool for developing the application 202.

The events obtained from each of the sources (server events 210, data access events 212 and application events 214) are written into the log file during execution of the application 204. The event writing tool is an efficient and scalable logging infrastructure that allows different processes on a machine to generate and log traces in a uniform manner to the same trace session. An event log can be generated on each machine (e.g., client, server) that involves either an application process or the DBMS server process.

A post-processing step is performed over the event log(s) to correlate the application and database contexts. The output of the post-processing step is a single view where both the application and database profile of each statement issued by the application are exposed. For example, a row in this view can contain information such as ProcessID, ThreadID, Function Identifier, SQL statement, Rows returned, Rows consumed, Columns returned, Columns consumed, SQL duration, Blocked duration, Reads, Writes, Error code, etc. This makes it possible to perform the application-level debugging and tuning that SQL application developers want to do.

In one implementation, the disclosed framework is for use in development environments where the overhead introduced due to application instrumentation is not a significant issue. In another embodiment, the disclosed framework is engineered for use in production systems where overhead processing due to application instrumentation is controlled. A brief description is provided herein for adapting the framework to production scenarios as well.

Figure 3:
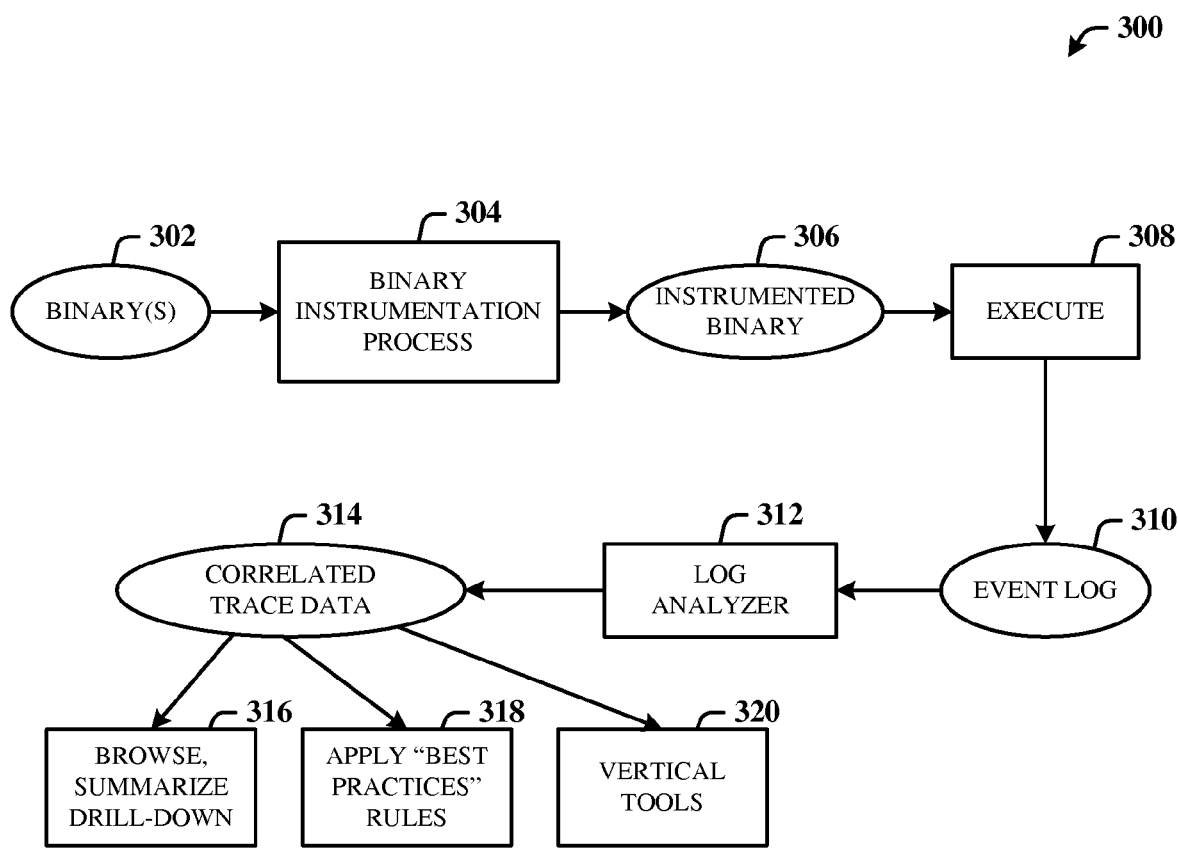
FIG. 3 illustrates an exemplary diagram for a database application debugging and tuning tool.

FIG. 3 illustrates an exemplary diagram for a database application debugging and tuning tool 300. An application is provided, the binary(s) 302 of which are instrumented through a binary instrumentation process 304, resulting in an instrumented binary 306. The instrumentation process 304 can insert code related to entry and exit functions, for example. The instrumented application is then executed at 308 to generate event information, which is then written into an event log 310. A log analyzer 312 (e.g., the analyzer component 104) processes the log information and outputs correlated trace data 314. The log analyzer 312 at least parses, matches and extracts application and server events. The trace data is schematized view of the application trace that contains both application and server context information. The data can then be user for other purposes. For example, the data 314 can be used for browse, summarize and drill-down operations, for the application of best practices rules, and for vertical tools (e.g., deadlock analyzer, fast hints, etc.). These will be described in greater detail below.

Figure 4:
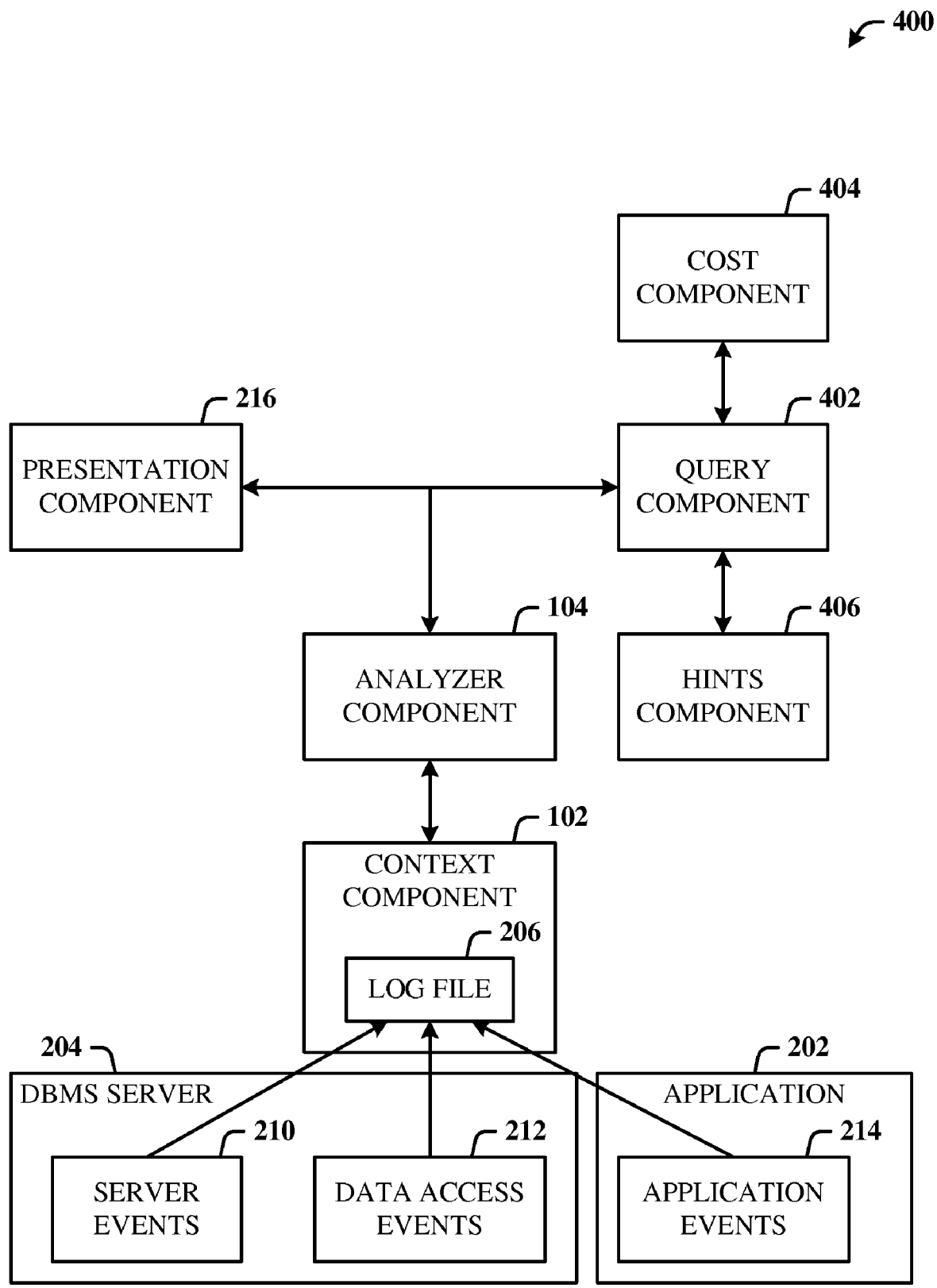
FIG. 4 illustrates an alternative system for application and database profiling.

FIG. 4 illustrates an alternative system 400 for application and database profiling. The system 400 augments the system 200 of FIG. 2 with a query component 402 for querying profile information (e.g., statements, instructions, etc.), a cost component 404 for computing a cost associated with making the query, and a hints component 406 generating query hints for more optimized and efficient query processing.

As described above, the tool takes as input the binaries of the application 202, which are then instrumented. When the instrumented binaries are executed, the log 206 of events is generated from the application 202 as well as the database server 204 (server events 210 and data access events 212). These events are then analyzed by a log analyzer component 104 which produces as output a schematized view of the application trace. This view allows flexible analysis over the trace and allows tasks.

A binary instrumentation toolkit and toolkit API is used to examine the binaries statically and place instrumentation calls at selected places. In one example, calls are added each time the application 202 enters or leaves a function. When the instrumented binary is executed the instrumented code does a callback into a function. This function generates a trace event of the form (EventType, Hostname, ProcessID, ThreadID, TimeStamp, Enter {functionName}) and writes the event to a profile session. Events from this session are then logged.

An event tracing infrastructure can be used which incurs a low overhead event logging mechanism. An event represents any activity of interest and is customizable by the event provider. Every event logged to a profiling session contains common attributes such as the name of the event provider, type of event, ID of the thread that issued the event, timestamp, and duration, for example. In addition, there is an attribute that allows provider-defined data to be logged. For instance, as described above, events logged by the instrumented application describe the name of the function that was entered (or left).

In one embodiment, the fact that SQL Server and the data access layer (e.g., ADO.NET, ODBC, and OLEDB) is instrumented to emit events on demand is leveraged. The SQL Server event provider can emit event types such as login audits, stored procedure execution completed, batch execution completed, deadlock, etc. Additionally, the server event provider emits custom data that has various interesting attributes like duration, rows returned by server, number of reads and writes, etc. The data access layer (e.g., ADO.Net) provides events corresponding to every data read API, opening and closing of connections, type of data access API used. When the instrumented application is run a trace control manager interface can be used enable the emitting of events by the three providers: application's instrumented binary, data access layer and database server layer.

The tool also ensures that all the events are logged to a unique profiling session. Thus, the timestamps of events across processes on the same machine are generated using a single mechanism, which make correlating these events easier. The single log corresponding to this session can subsequently be analyzed offline after the application has finished running.

As an example, for the Function foo( ) shown below, which uses data access APIs (e.g., ADO.Net) to connect to the database server, the trace log shown in Table 1 below is generated.

```
Function foo( ) {
    SqlConnection conn = new SqlConnection;
    Conn.Open( );
    Cmd = conn.GetCommand( );
    Cmd.Text = "select * from T";
    Cmd.ExecuteQuery ( );
    Conn.Close( );
}
```

TABLE 1

Trace log generated for Function foo( ).

| Event Type | Proc. id | Thread id | Timestamp | Provider data |
|---|---|---|---|---|
| App Event | 596 | 234 | 403065 | "Enter {foo}" |
| Data access Event | 596 | 234 | 403075 | "Open connection" |
| Data access Event | 596 | 234 | 403085 | "GetCommand API" |
| Data access Event | 596 | 234 | 403095 | Set text "select * from T" |
| Data access Event | 596 | 234 | 403105 | "SqlCommand.ExecuteQuery" |
| Server Event | 128 | 104 | 403115 | "select * FROM T"; Duration=100; Reads=40..." |
| Data access Event | 596 | 234 | 403125 | "Close connection" |
| App Event | 596 | 234 | 40135 | "Leave {foo}" |

Note that only a few relevant attributes are shown. Further note the three types of events in Table 1: application, data access and server, and that the common information available across processes is timestamps. The provider data column contains the actual payload of the event (e.g., in the form of SQL statement strings, etc.).

The analyzer component 104 takes as input the trace log file 206. The analyzer 104 correlates the events from the three providers and produces as output a schematized view of the application trace that contains both application and server context information. Following is an example of a schematized view (represented in XML).

```
- <ExecutionTrace ProcessID='596'>
  - <ThreadID ThreadID='234'>
    - <Function Name='foo' InvocationCount='1' ExclusiveTime='22' InclusiveTime='807'>
      - <OpenConnection ConnectionID='1' Server='SERVERNAME' DataBase='DATABASENAME'>
        - <SQL Event='BatchCompleted' TextData='Select * From T' StmtType='Select' DatabaseID='22' HostName='MACHNAME' ApplicationName='AppTest' SPID='51' Duration='100' Reads='40' Writes='0' CPU='13' Error='0' DatabaseName='TPCD' RowCounts='37906' ReadsIssuedByApplication='762' Type='ExecuteReader' />
      </OpenConnection>
      <CloseConnection ConnectionID='1' />
    </Function>
  </ThreadID>
</ExecutionTrace>
```

Note that the output shows the thread ID, function name, the SQL statement issued by the function, database server context for the statement. This output allows flexible analysis over the trace and allows tuning and debugging tasks. Thus, the log analyzer component 104 correlates the application and database contexts from the event log 206.

The log analyzer component 104 correlates the three types of events: application events (e.g., function enter/leave), data access events (e.g., ADO.Net) and database server events (e.g., SQL Server). Correlating an application event and a data access event can occur since both of these events are emitted from the same process. Given the ThreadID and Timestamp, it is possible to correlate exactly the data access events that are executed within a particular invocation of a function.

However, matching a data access event D with the corresponding database server event(s) can be challenging. A unique identifier is used for an event that is unique across the application and server processes. However, such a unique identifier is unavailable in conventional systems for data access providers. One useful attribute available from each event in the database server side is the client process ID. Thus, the data access event D is matched with the server event S only if the D.ProcessID=S.ClientProcessID. However, since a single process may issue multiple SQL statements concurrently (e.g., on different threads), additional techniques for narrowing down the possible matches are desired.

Two additional pieces of information are used to assist matching. First is the timestamp. For example, a data access event such as SqlCommand.Execute can precede the corresponding server event which is emitted once the SQL command has executed. This can significantly narrow down the possible server events that can match. Second, the provider data contains the actual string of the command being executed. An issue with relying on matching strings is that exact string matching is not robust for this task. This is because the string by the data access layer may get modified in the server. Therefore, approximate matching is relied on rather than exact string matches.

There are many techniques that have been developed for approximately matching strings. One version tokenizes the strings based on delimiters and computes the intersection of tokens between the two strings. This technique is significantly more reliable than exact string matching.

Following are scenarios that share a common thread and which can be achieved using both correlated application and database context information. Consider a query Q10 from a TPC-H (transition processing performance council) decision support benchmark, that returns for each customer the revenue lost due to items returned by the customer. The query is a join between four tables (e.g., customer, order, lineitem and nation) and returns the customers in descending order of the lost revenue. The application code that consumes the results of the query may be written for example as:

```
Reader = cmd.Execute( );
while(Reader.Read ( ))
{
    LostRevenue = Reader["REVENUE"]
    if(LostRevenue <= MINREVENUE)
       break;
    // process the row in some way...
}
``` where the variable LostRevenue is bound to the column of the query which computes the revenue lost by the customer. In any given execution, the application may only consume a few rows from the entire result set of the query. In most DBMSs, when a query is executed, the query optimizer generates a plan that is optimized for the case when all rows in the result set are needed. If the above query returns many rows (e.g., N) and the application consumes only k (k<<N, that is, k being much less than N), then it may be beneficial to pass a query hint to the database server requesting that the plan be optimized for returning the top k rows quickly.

For example, in SQL server this can be achieved by using an OPTION (FAST k) query hint. The information about what value of k (number of rows consumed by the application) is appropriate can be obtained from the application context. Once this information is available, it is possible to perform interesting analysis that can suggest to the developer if providing the hint will actually benefit the performance of the query.

A common performance problem on a server arises when applications do not parameterize the SQL. For example, consider a function in the application that, when invoked with a parameter p (e.g., a value 23), executes a SQL statement with the value of that parameter: "Select . . . FROM R, S . . . WHERE . . . AccountId=23". In another invocation, the parameter value could be different, and therefore in each invocation, a different SQL text is submitted to the server. Thus, the server is required to treat each statement as requiring a potentially unique execution plan. Note that conventional DBMSs have autoparameterization capabilities; however, this typically applies only to simple queries (such as single table selection queries). Thus, in the above example, the application can cause unnecessary compilations and inefficient usage of the DBMS procedure cache.

Since the execution plans that are optimal for each of these instances is likely to be the same, it is far more efficient for the application to parameterize its SQL: "Select . . . FROM R, S . . . WHERE . . . AccountId=@p", and pass in the parameter value via the data access APIs in the application. This tells the database server to treat different instances of that query as a single statement with a shared plan. This can dramatically reduce the compilation time as well as resources consumed in the procedure cache.

With respect to opportunities for bulk operations, consider a loop in the application code, shown below, inside which the application is inserting data into a table:

```
for(int i=0;i<MAXVALUE;i++) {
    // execute SQL statement INSERT INTO T VALUES (...)
}
```

As written above, the code is inefficient since each time through the loop an INSERT statement is executed. A more efficient way to achieve the same result is to use the bulk insert APIs of the data access layer, which take advantage of batching. Note that the ingredient for identifying this problem is having the application context that a particular SQL statement is executed repeatedly inside a loop and the database context know that each instance is in fact an INSERT statement on a table T. It is then possible to put these pieces of information together to suggest a mapping to the bulk insert APIs.

With respect to suggesting appropriate use of data access APIs, many database application developers may be unaware of certain best practices for using data access APIs such as ADO.Net. For example, when executing a stored procedure, the best practice is to use the command Type.StoredProcedure, passing the parameters using the AddParameters API. This results in a remote procedure call (RPC) event and is therefore efficient. However, a developer who is unaware of this may pass in a string such as "exec my_sp 10". In this case, the database server gets a language event which needs to be parsed to find the stored procedure to be invoked, arguments to be passed, etc. If the above code is executed many times, the performance improvement by using an RPC event compared to language event can be significant. In this example, beneficial information from the application context is knowing that a language event was issued by the application and knowing from the database context that what was issued was in fact a stored procedure.

A second example of API usage arises when a query returns a scalar value (one row and one column) as the result. For such cases, ADO.Net provides an ExecuteScalar API that is much more efficient that the more general ExecuteReader API. In this example, the application context includes the fact that ExecuteReader API was used, and the database context is the fact that the query returns exactly one row and one column in its result set.

With respect to identifying sequences for index tuning, consider a sequence of SQL statements such as the one given below that is issued by an application:

```
CREATE TABLE R (...)
INSERT INTO R SELECT ... FROM ... WHERE ...
SELECT ... FROM R, T WHERE ...
DROP TABLE R
```

A characteristic of the above sequence is that table R is transient. It is possible that if the application were to issue a CREATE INDEX statement on table R after the INSERT statement, but before the SELECT statement (there may be multiple such statements), the SELECT statement(s) could be sufficiently speeded up to offset the cost of creating the index. A tool can be utilized that, given a sequence of SQL statements, is able to recommend if indexes should be created or dropped in the sequence to reduce overall cost of the sequence.

The developer, who is the user of such a tool, still should be able to find such sequences in the application, since applying the recommendations of the tool includes changes to the application code. The user should understand the function(s) involved in producing the sequence of statements. Since a sequence can span function boundaries, extracting a sequence of SQL statements uses knowledge of the call graph structure of the application which is available in the application-side context.

Figure 5:
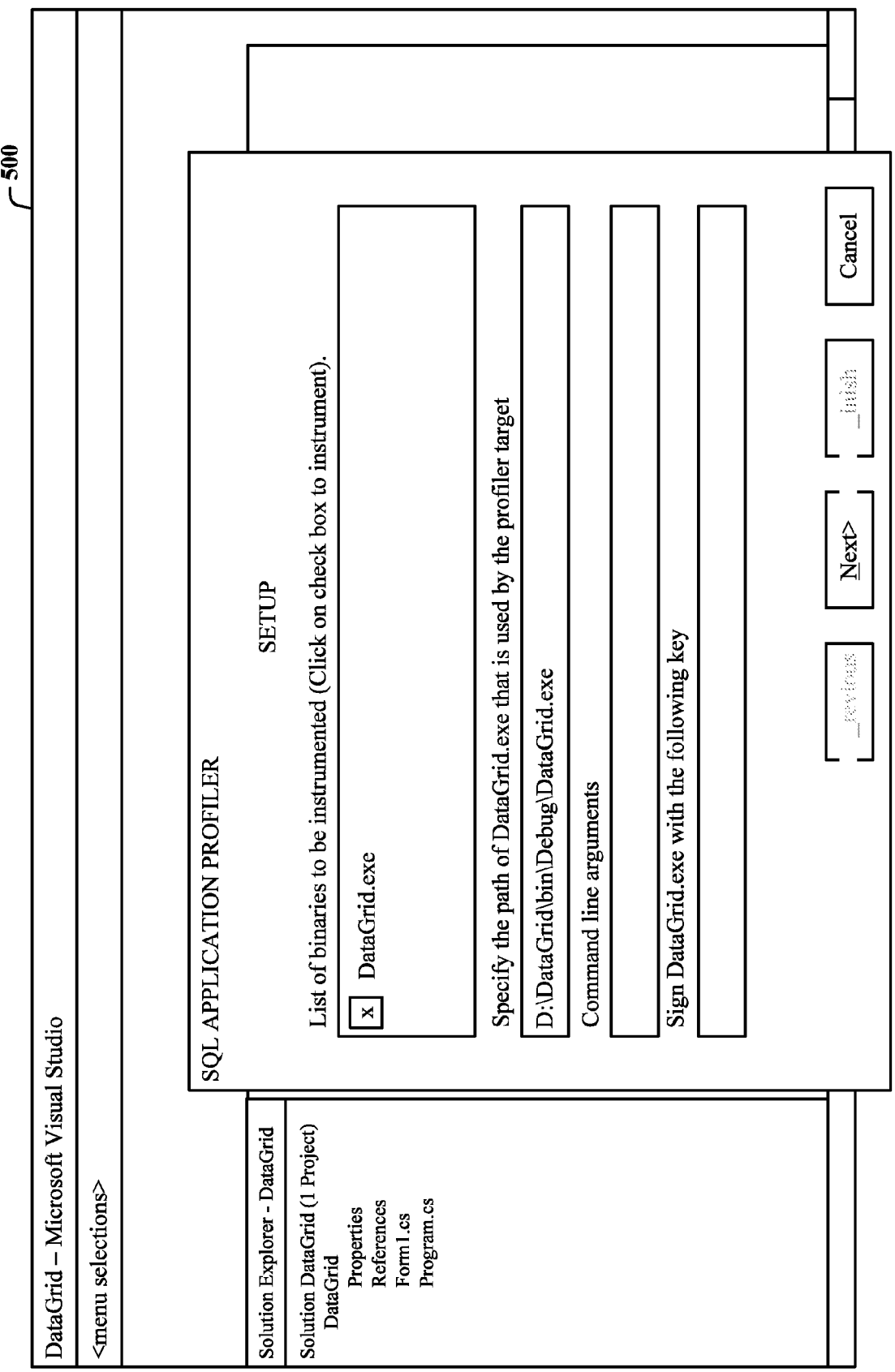
FIG. 5 illustrates an exemplary UI where the disclosed framework is employed as an extension of a conventional development application.

FIG. 5 illustrates exemplary UI 500 where the disclosed framework is employed as an extension of a conventional development application. In one implementation, Visual Studio™ by Microsoft Corporation provides VSS (Visual Studio System) extensibility APIs that can be used to integrate the functionality of the framework. The framework (or tool) takes as input the application binaries. A typical usage scenario of the tool is to open the project corresponding to the target that needs to be profiled. In FIG. 5, the developer opened a DataGrid project and clicked on an Add-In menu of Visual Studio to invoke the tool. Since the tool is integrated into VSS, tool can automatically enumerate the VSS project system to get the target executable file(s) to be instrumented and determine any dependencies (like dynamically linked libraries) that may also need to be instrumented. Alternatively, the developer is presented with a choice to point the tool to a specific set of binaries. In this particular implementation, the tool enables the developer to profile any .NET application that uses ADO.NET interfaces to talk to a SQL Server database server.

Once instrumented, the developer can click through the wizard, which launches the application after enabling tracing for all the three event providers: SQL Server tracing, data access tracing, and instrumented events from the application. This allows events containing both application context and database context to be logged into the event log file. As previously indicated, the post-processing step is performed by the log analyzer that correlates application and server events using a set of matching techniques. The above collection and matching enables bridging the database context and application context to provide significant value to database developers.

Figure 6:
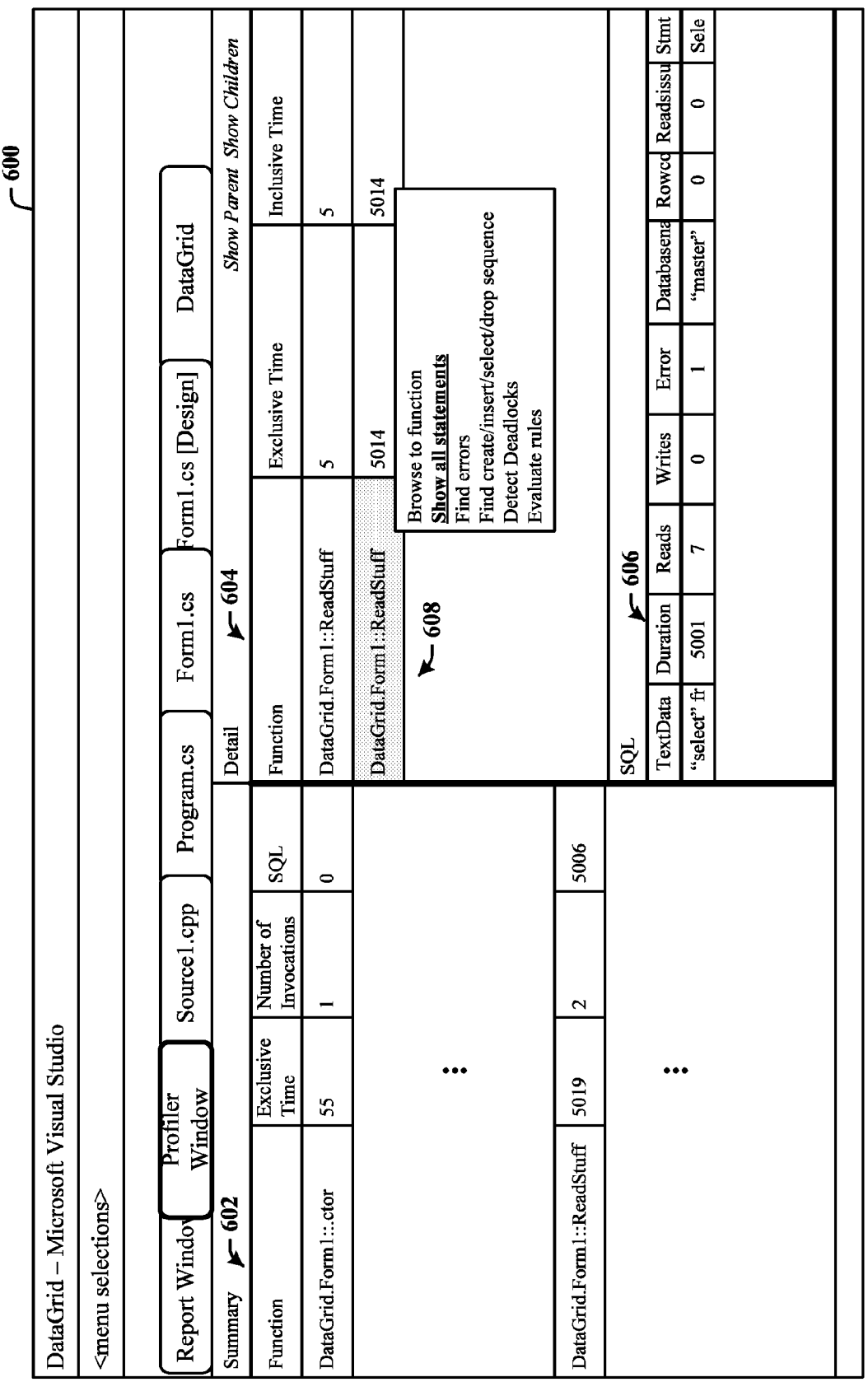
FIG. 6 illustrates an exemplary user interface of a summary/detail view.

Once the post-processing step is complete, the tool invokes a module corresponding to the summary/drill down box 316 of FIG. 3, the output of which is a summary/detail view. FIG. 6 illustrates an exemplary user interface 600 of a summary/detail view. Developers can get a summary and detail view involving various counters from the application, the data access layer and the server, navigate the call graph hierarchy and invoke specific verticals. The functional overview and usage of the tool is described below.

The summary view 602 gives the function name, aggregate time spend in a function, how many times the function was invoked and aggregate time spend executing the SQL statement (issued by the particular function) in the database server. Conventionally, the "Function", "Exclusive Time" and "Number of Invocations" counters can be obtained from profiling the application using application side profiling tools; however, the "SQL Duration" 606 is an example of a value-added feature, since it merges database context into the application context.

Consider the function ReadStuff in FIG. 6 which issues a SQL call. From the Summary view 602 the developer can determine that the function was called twice (bolded by white characters on black background) and the aggregate time (Exclusive Time) spent inside this function (across all instances) was 5019 ms. Out of the total time spent in the function, most of the time was spent executing SQL (5006 ms).

The Detail view 604 gives more information at a function instance level. The tool allows drill-down to display attributes of all the statements that were issued under the particular instance of the function or statements that were issued under the call tree of the particular instance of the function. The attributes of the SQL statement that are displayed include counters like Duration, Reads, Writes, also data access counters such as reads issued by the application, and the data access API type, corresponding to the SQL that was issued.

The tool also allows analysis tools to be built on top of the profiled and correlated trace data such as suggesting FAST-k query hint, finding patterns of SQL statement invocations, detecting deadlocks, finding connection object leaks, etc.

FIG. 7 illustrates an exemplary algorithm 700 for matching used by the log analyzer component. The algorithm 700 maintains a thread context, which is a data structure that maintains a list of strings corresponding to the SQL events issued by this thread that are not yet matched to a SQL server event. It is to be understood that different optimizations can be implemented to make the algorithm 700 more efficient.

Up to this point, the focus has been for scenarios during application development and debugging where instrumentation overheads are typically not an issue. However, to use the tool framework for a production setting, overheads can be managed. Following are a few techniques for controlling these overheads.

First, static analysis of a binary can help determine if a function can possibly perform a data access call, and then only instrument such functions. Note that with this optimization, since functions without data access calls are not instrumented, the call graph of function calls made by the application could be lost.

Second, the developer may be aware of which binaries, or even which functions are of interest for profiling. The disclosed binary instrumentation process 304 of FIG. 3 can take a list of such binaries/functions as input and only instrument the specified functions.

Third, it can be configured to only request the data access and server providers to emit only necessary events. For example, the events in the data access layer (e.g., ADO.Net) that are emitted each time an application consumes a row can be disabled (or turned off). In this case, instrumentation overhead is traded off for some application context information (e.g., number of rows consumed by application).

As previously described supra, the log analyzer component 104 produces a schematized view of the application trace that contains both application and server context information. The view generated can subsequently be queried (using the query component 402 of FIG. 4) for providing browse, summarize and drill-down functionality. For example, the tool allows developers to explore function call hierarchies and allows drill-down on SQL statements that were issued under a function/call tree.

Following is a description of two vertical debugging and tuning tools for performing more advanced analysis over the profiled data 314 of FIG. 3. The first example shows how to detect functions in the application that caused a deadlock in the DBMS server. The second example describes how to recommend to the application developer the suggested use of an OPTION (FAST k) query hint for an expensive query whose entire result set may not be consumed by the application.

The SQL server trace produces a Deadlock event which contains the wait-for graph that describes a deadlock. The graph contains the statements being executed that resulted in the deadlock as well as timestamp, and client process ID(s) information. The log analyzer component 104 extracts this information and stores it in the schematized application trace under the root node of the tree (as an event of type deadlock).

For each such deadlock event, the deadlock analysis "vertical" finds the statements issued by the application that correspond to the statements in the deadlock event. Note that once the statement is found, all associated application context such as function and thread can be obtained. This can then be highlighted to the developer so they can see exactly which functions in the application issued the statements that lead to the deadlock.

Figure 8:
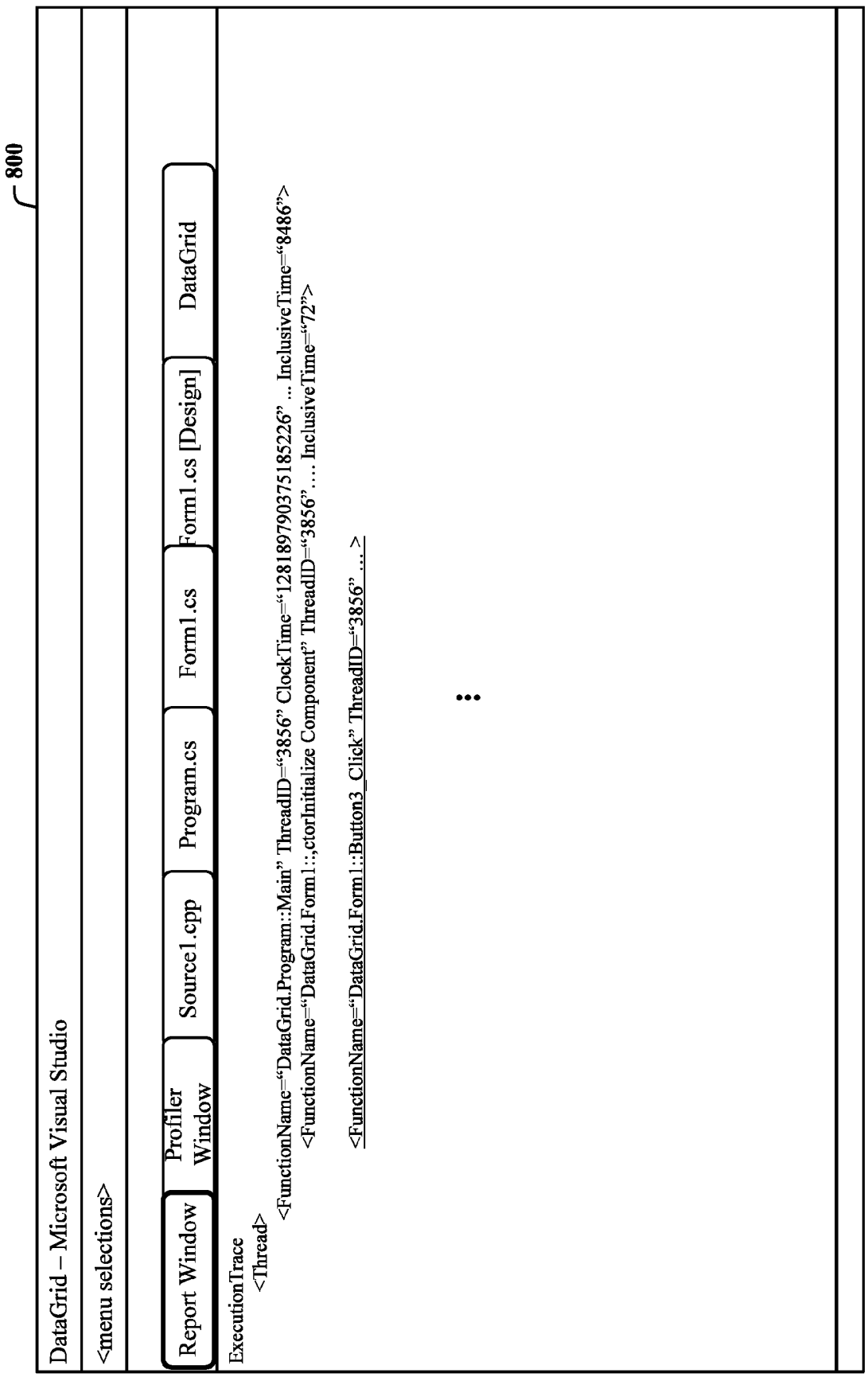
FIG. 8 illustrates an exemplary user interface of a sample output from the deadlock analysis vertical.

FIG. 8 illustrates an exemplary user interface 800 of a sample output from the deadlock analysis vertical. The output of the log analyzer component 104 is expanded to the right level and, the functions and the SQL events that caused the deadlock in the server can be emphasized (e.g., highlighted, bolded, underlined, etc.).

In the above description an example of a query is provided that returns many rows of which only a few are consumed by the application. It is possible to implement a significant speed-up if the application developer can rewrite the query to pass in an OPTION (FAST k) query hint to the database server, so that the query optimizer can choose a plan that is more optimal when k rows are needed (as opposed to all rows needed). Thus, the developer can point to a query and invoke a Fast-k analysis tool which returns as output an analysis of how the cost of the query varies with k. This cost information can be used by the developer to decide if it is appropriate to rewrite the query to use the hint.

The Fast-k analysis tool explores how the cost of the query varies with k (in OPTION (FAST k) hint). The naïve approach of costing the query for each value of k is not scalable. However, in a well-behaved query optimizer, the cost of the query plan cannot decrease as k is increased. For a large class of queries (such as single block SPJ (Select-Project-Join) queries with grouping/aggregation) this assumption typically holds true.

The disclosed approach includes performing a binary search over the range of values of k (between $k_{min}$ and $k_{max}$), where $k_{min}$ is the number of rows consumed by the application and $k_{max}$ is the total number of rows returned by the query. Note that both these pieces of information are available from the output of the log analyzer component. If the plan (and hence the cost) of the query remains the same for two different values of k (e.g., $k_1$ and $k_2$), then it is known that the plan (and cost) remains the same for all values of k between $k_1$ and $k_2$ as well. Thus, the binary search strategy allows the pruning out of a large part of search space quickly. By observing such output, the developer can determine whether or not providing the OPTION (FAST k) query hint is appropriate for the application.

Figure 9:
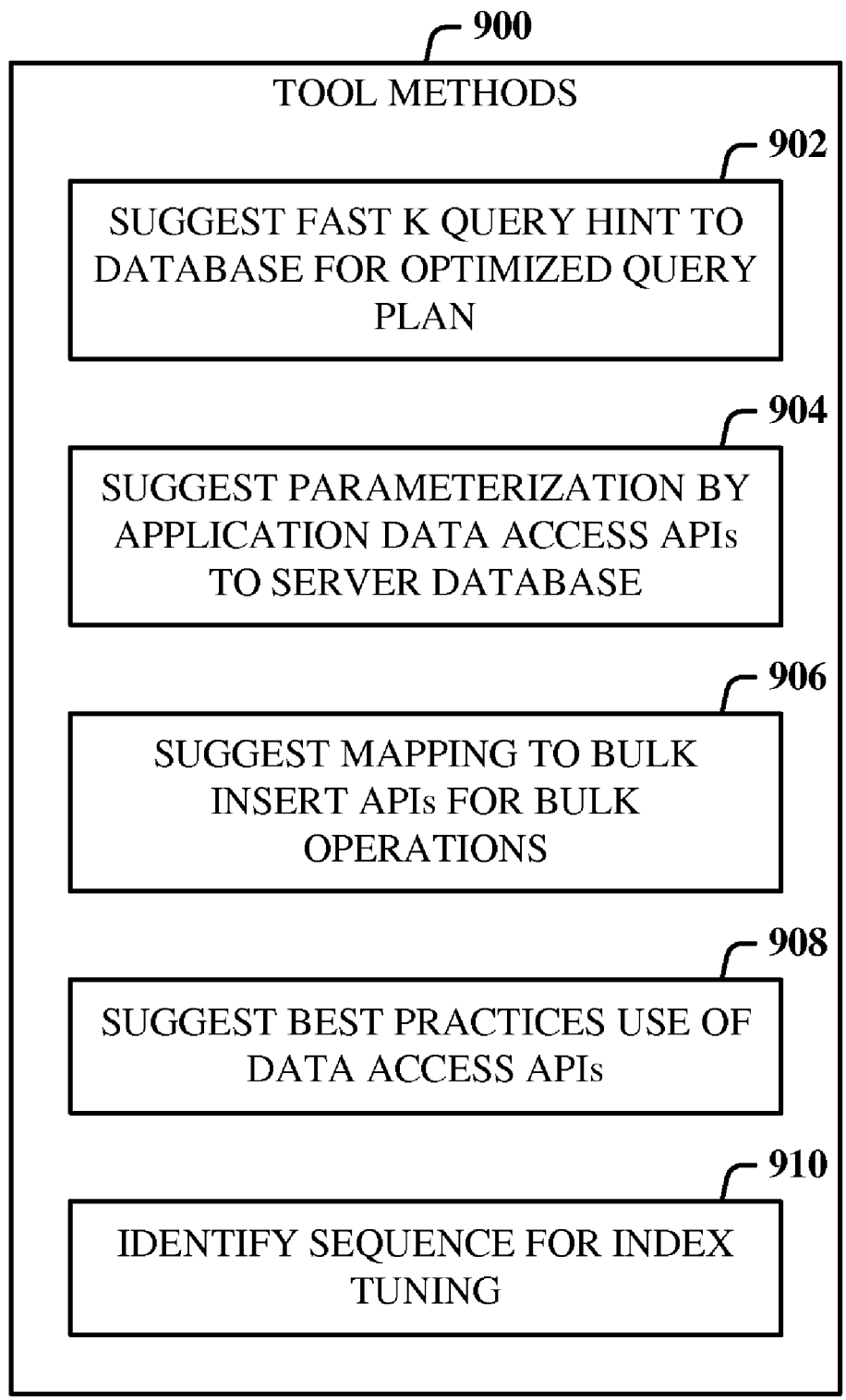
FIG. 9 illustrates methods provided by the disclosed tool.

FIG. 9 illustrates methods 900 provided by the disclosed tool. A first method 902 suggests the Fast-k query hint to the database server for an optimized query plan. A second method 904 suggests parameterization by application data access APIs to the server database. A third method 906 suggests a mapping to bulk insert APIs for bulk operations. A fourth method 908 suggests best practices use of the data access APIs. A fifth method 910 identifies sequences for index tuning.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
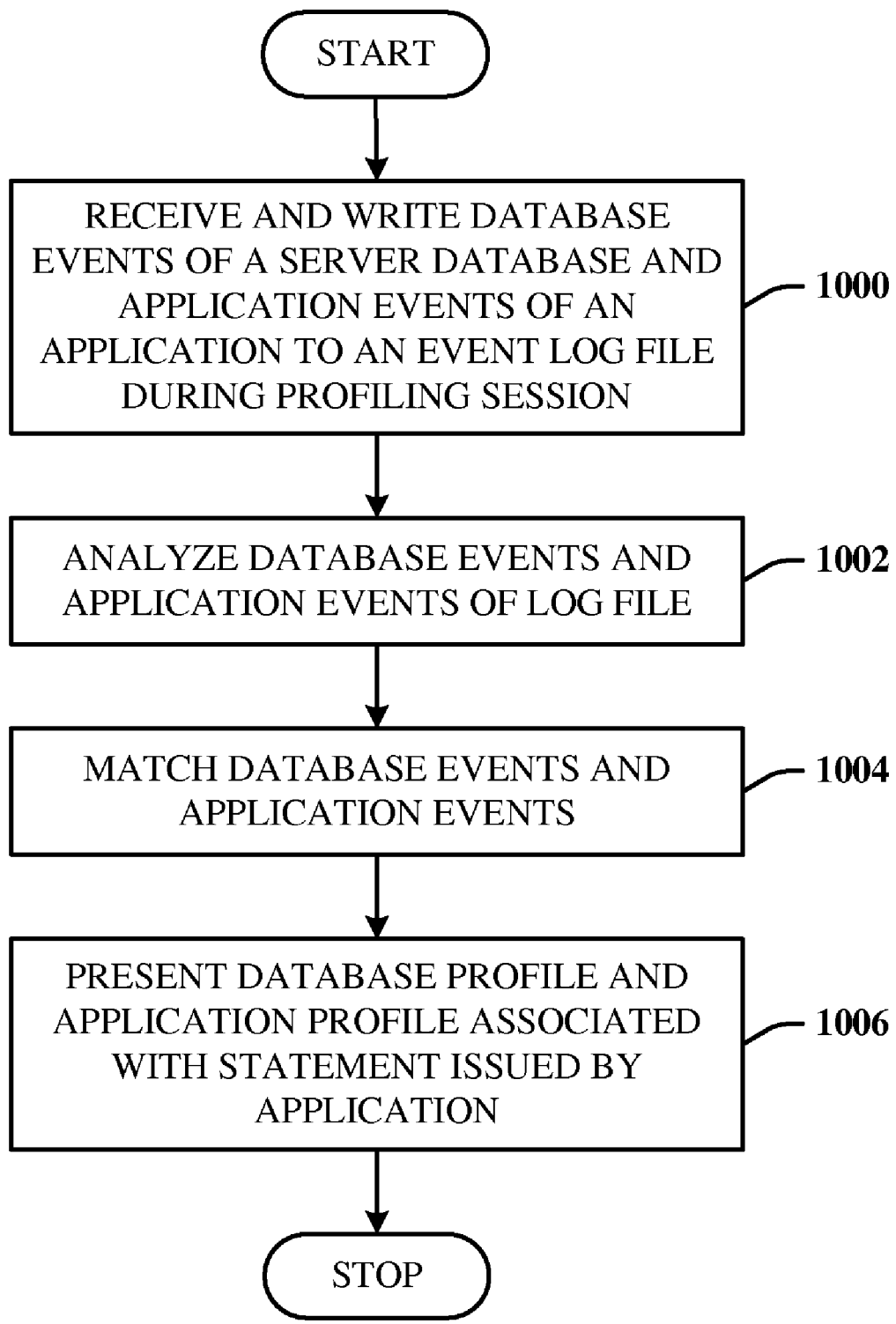
FIG. 10 illustrates a method of application and database profiling.

FIG. 10 illustrates a method of application and database profiling. At 1000, database events of a server database and application events of an application are received and written to an event log file during a profiling session. At 1002, the database events and application events of the log file are analyzed. At 1004, the database events and application events are matched. At 1006, a database profile and an application profile associated with a statement issued by the application are presented in a single view.

Figure 11:
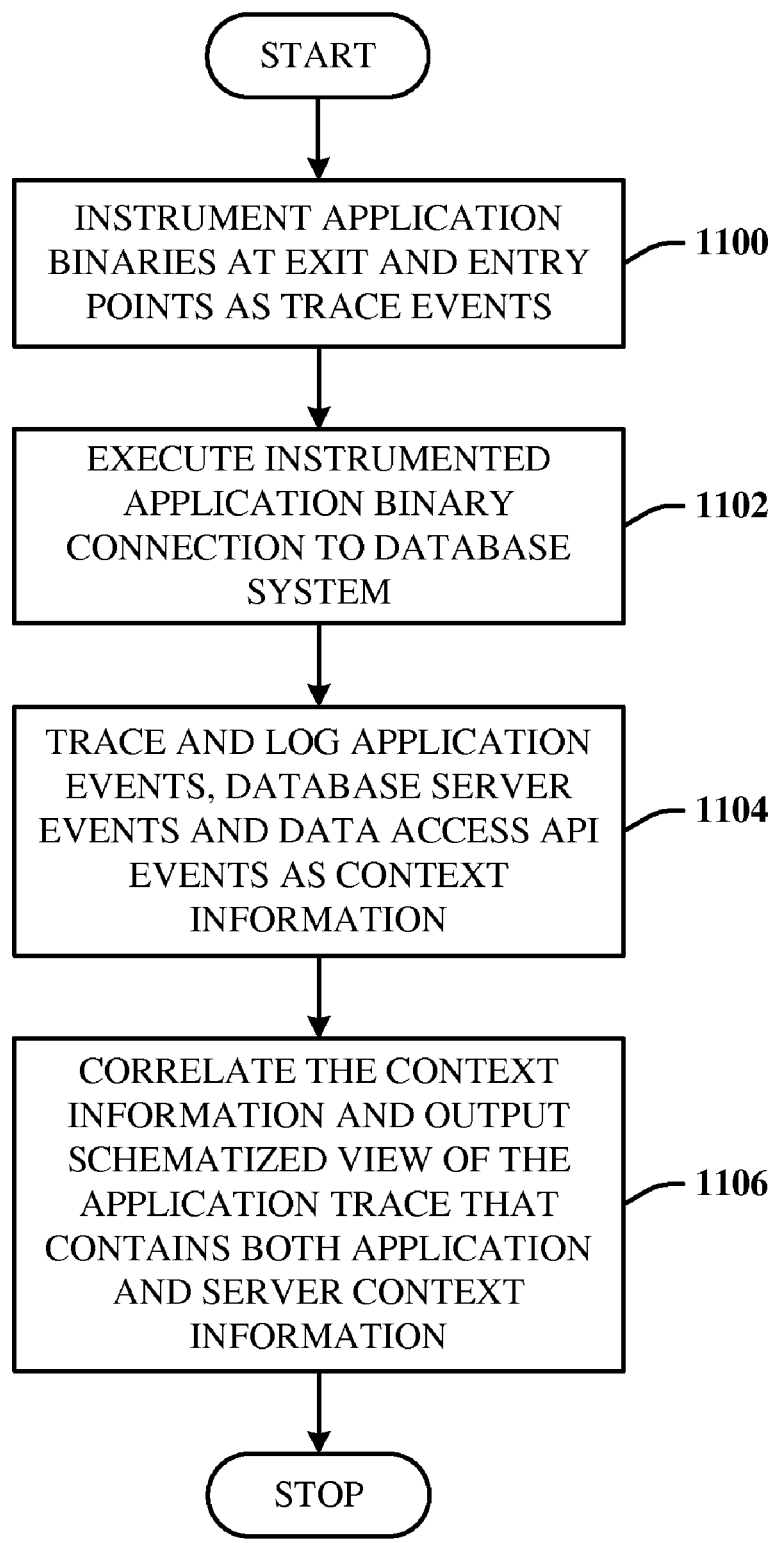
FIG. 11 illustrates a method of providing database context via an application.

FIG. 11 illustrates a method of providing database context via an application. At 1100, the application binary(s) are instrumented at exit and entry points as trace events. At 1102, the instrument application binary(s) are executed as a connection to the database system. At 1104, application events, database server events, and data access API events are traced and logged as context information. At 1106, the context information is correlated and a schematized view of the application trace is output, the view containing both the application context information and the server context information.

Figure 12:
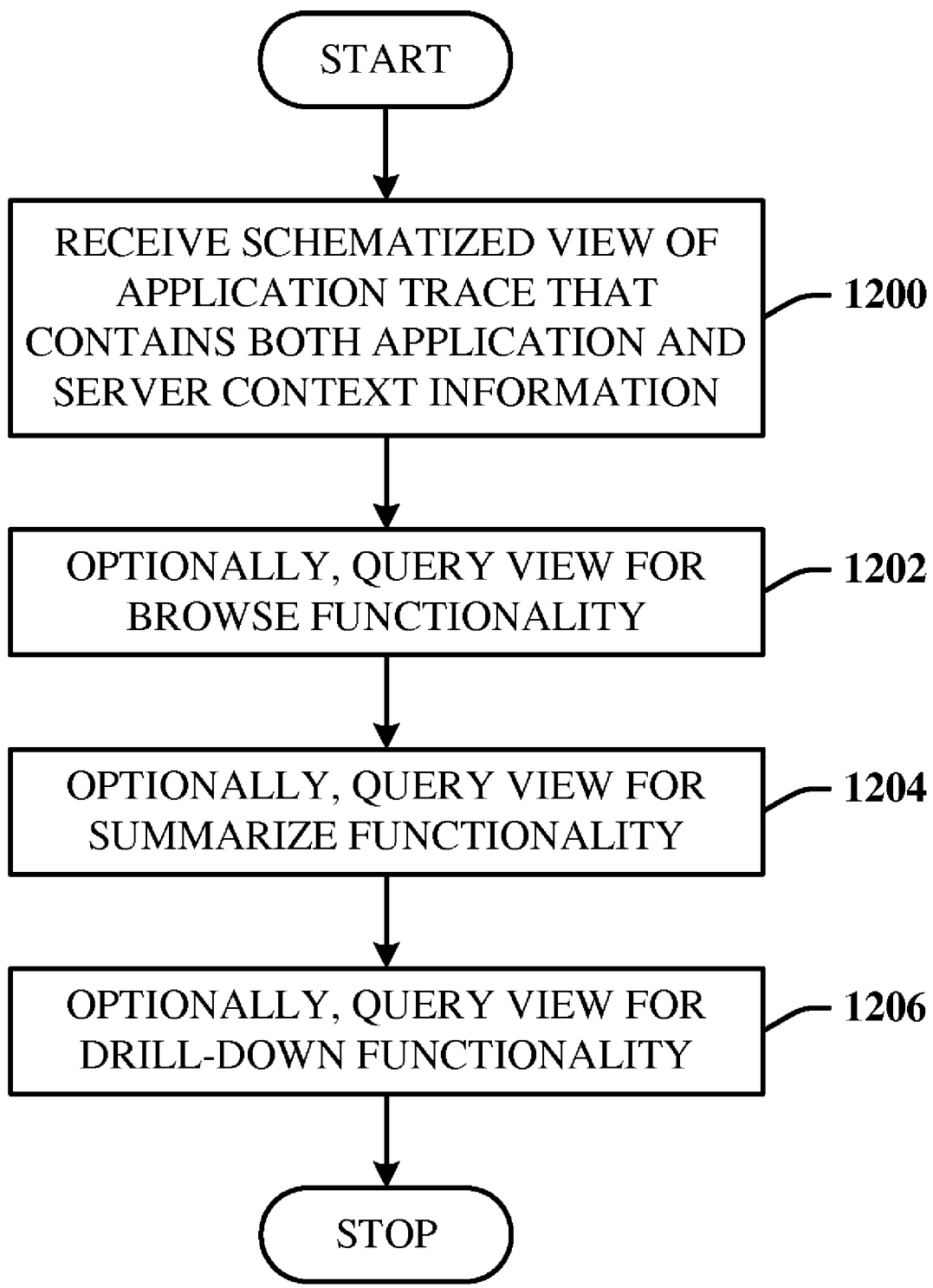
FIG. 12 illustrates a method of querying the schematized view of the application trace.

FIG. 12 illustrates a method of querying the schematized view of the application trace. At 1200, a schematized view of the application trace is output, the view contains both the application context information and the server context information. At 1202, optionally, the user can query the view for browse functionality. At 1204, optionally, the user can query the view for summarize functionality. At 1206, optionally, the user can query the view for drill-down functionality.

Figure 13:
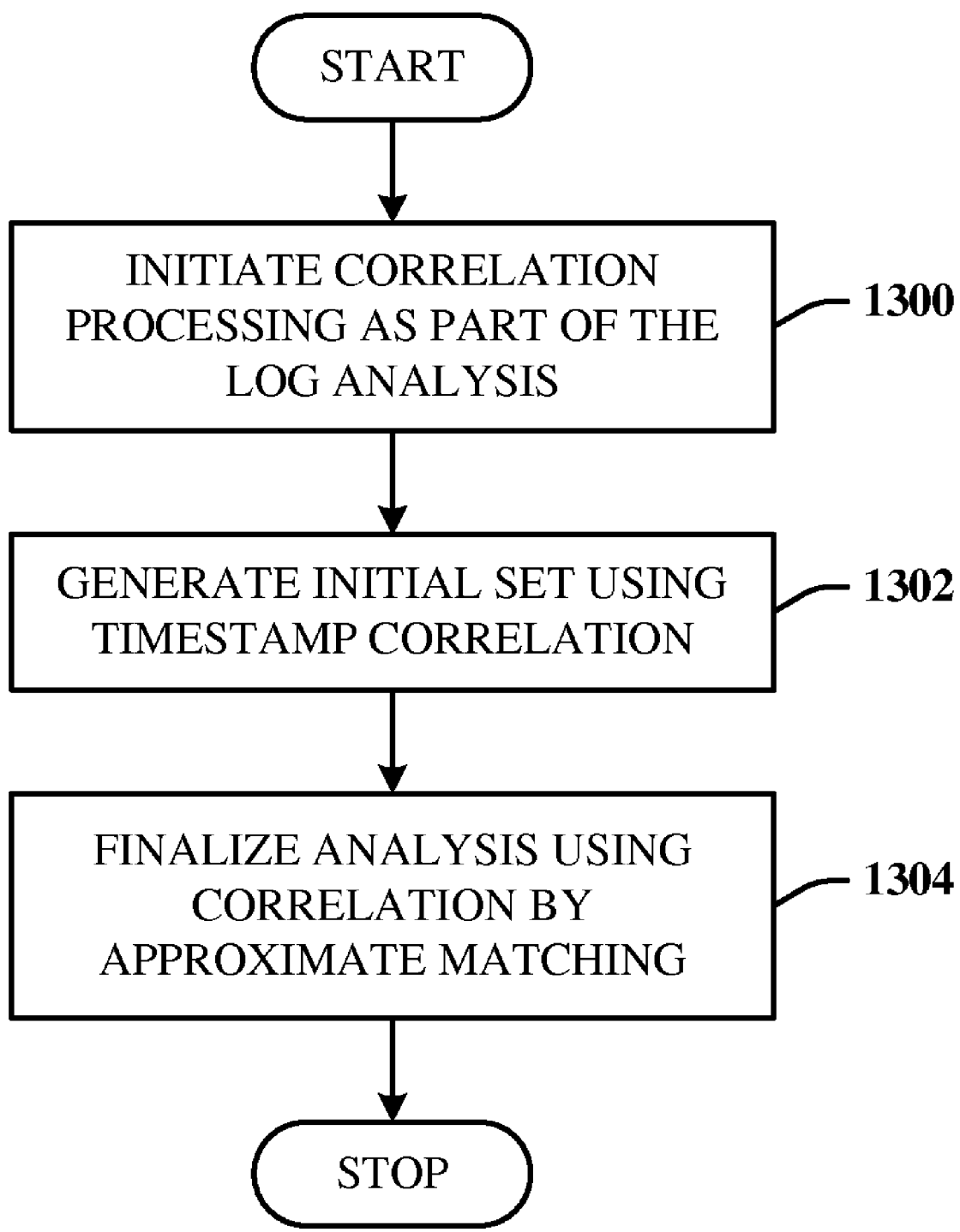
FIG. 13 illustrates a method of correlating context information.

FIG. 13 illustrates a method of correlating context information. At 1300, the correlation process is initiated as part of the log analysis. At 1302, generate initial set of events using timestamp correlation. At 1304, finalize analysis using correlation by approximate matching.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 14:
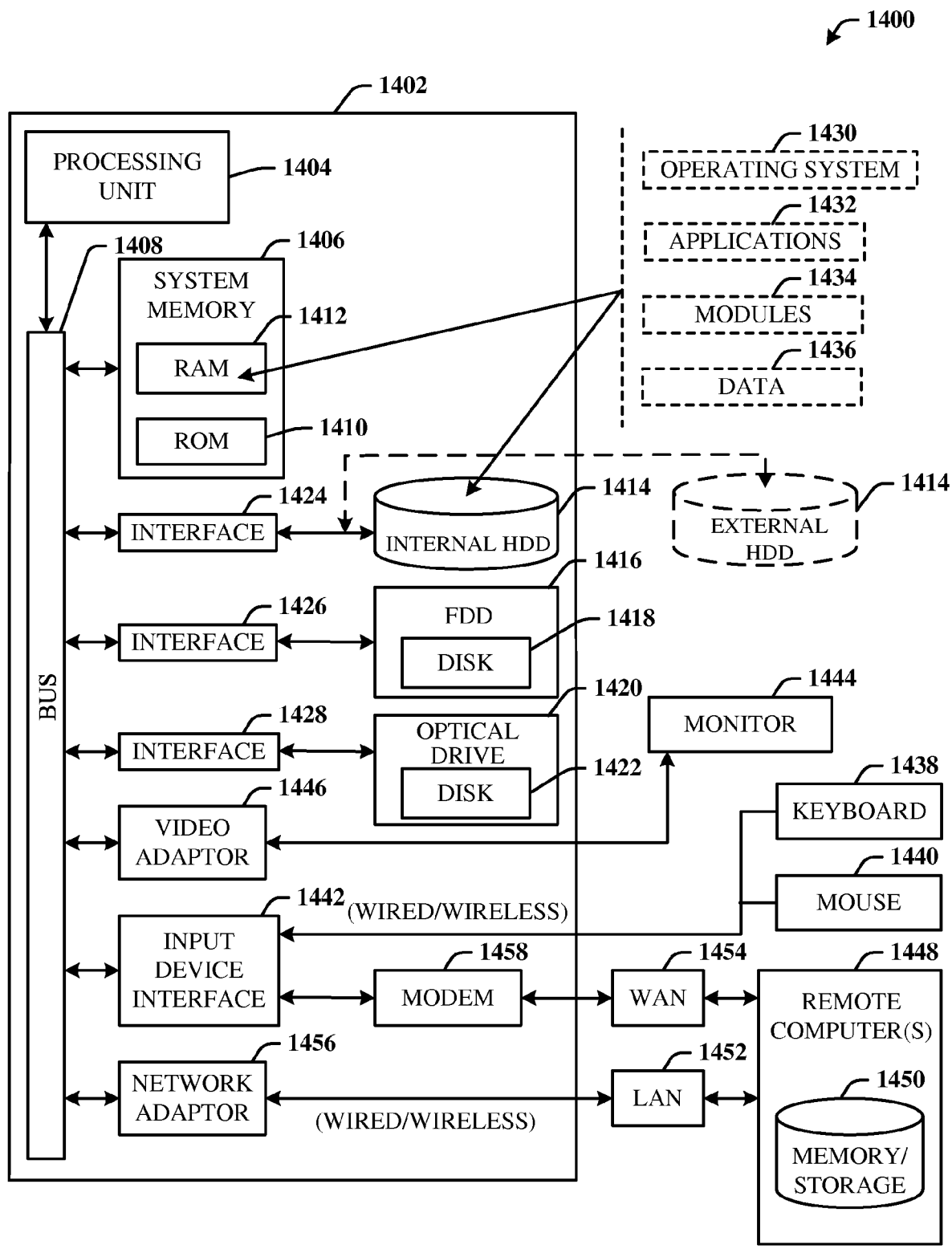
FIG. 14 illustrates a block diagram of a computing system operable to execute the disclosed profiling architecture.

Referring now to FIG. 14, there is illustrated a block diagram of a computing system 1400 operable to execute the disclosed profiling architecture. In order to provide additional context for various aspects thereof, FIG. 14 and the following discussion are intended to provide a brief, general description of a suitable computing system 1400 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 14, the exemplary computing system 1400 for implementing various aspects includes a computer 1402, the computer 1402 including a processing unit 1404, a system memory 1406 and a system bus 1408. The system bus 1408 provides an interface for system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a nonvolatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies.

The drives and associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1412, including an operating system 1430, one or more application programs 1432, other program modules 1434 and program data 1436. The one or more application programs 1432, other program modules 1434 and program data 1436 can include the context component 102, the analyzer component 104, application context, database context, application 202, DBMS server 204, log file 206, database 208, sever events 210, data access events 212, application events 214, presentation component 216, single view 218 and database and application profile 220 in the view 218. This can further include the entities of FIG. 3, the query component 402, cost component 404 and hints component 406 of FIG. 4, and the matching algorithm 700, for example.

All or portions of the operating system, applications, modules, and/or data can also be cached in the RAM 1412. It is to be appreciated that the disclosed architecture can be implemented with various commercially available operating systems or combinations of operating systems.

A user can enter commands and information into the computer 1402 through one or more wire/wireless input devices, for example, a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wire and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wire/wireless connectivity to a local area network (LAN) 1452 and/or larger networks, for example, a wide area network (WAN) 1454. Such LAN and WAN networking environments are commonplace in offices and companies, and facilitate enterprise-wide computer networks, such as intranets, all of which may connect to a global communications network, for example, the Internet.

When used in a LAN networking environment, the computer 1402 is connected to the local network 1452 through a wire and/or wireless communication network interface or adapter 1456. The adaptor 1456 may facilitate wire or wireless communication to the LAN 1452, which may also include a wireless access point disposed thereon for communicating with the wireless adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wire and/or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 15:
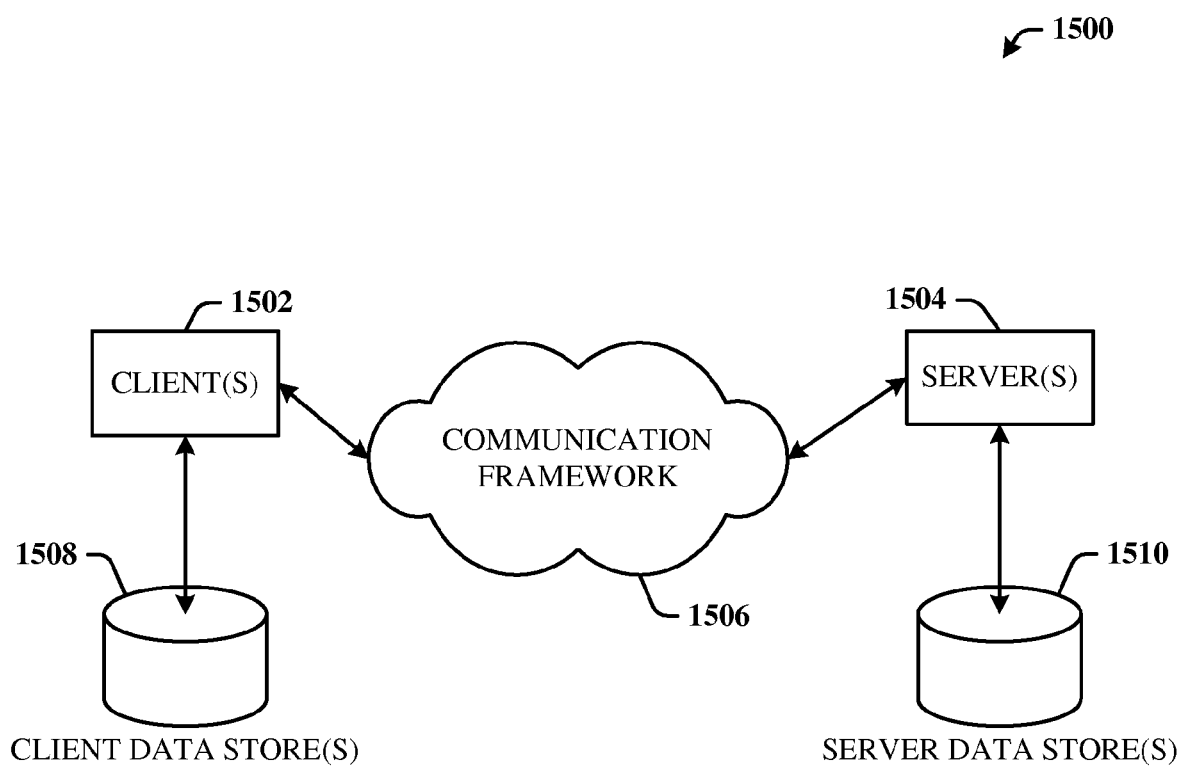
FIG. 15 illustrates a schematic block diagram of an exemplary computing environment for application/server profiling in accordance with the disclosed architecture.

Referring now to FIG. 15, there is illustrated a schematic block diagram of an exemplary computing environment 1500 for application/server profiling in accordance with the disclosed architecture. The system 1500 includes one or more client(s) 1502. The client(s) 1502 can be hardware and/or software (e.g., threads, processes, computing devices). The client(s) 1502 can house cookie(s) and/or associated contextual information, for example.

The system 1500 also includes one or more server(s) 1504. The server(s) 1504 can also be hardware and/or software (e.g., threads, processes, computing devices). The servers 1504 can house threads to perform transformations by employing the architecture, for example. One possible communication between a client 1502 and a server 1504 can be in the form of a data packet adapted to be transmitted between two or more computer processes. The data packet may include a cookie and/or associated contextual information, for example. The system 1500 includes a communication framework 1506 (e.g., a global communication network such as the Internet) that can be employed to facilitate communications between the client(s) 1502 and the server(s) 1504.

Communications can be facilitated via a wire (including optical fiber) and/or wireless technology. The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504.

The clients 1502 can include the application 202 and the servers can include the DBMS server 204, for example.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system for application development, the computer-implemented system comprising:
   a context component configured to obtain, during a profiling session:
      application context information of an application, the application context information including data access events reflecting data access application programming interface (API) calls by the application to access a database, and
      database context information of the database, the database context information including database server events exposed for profiling by a database server, the database server events reflecting execution of queries by the database server responsive to the data access API calls by the application;
   an analyzer component configured to:
      tokenize strings of the data access events and other strings of the database server events based on delimiters, and
      compute intersections of tokens between the strings of the data access events and the other strings of the database server events to match the strings of the data access events to the other strings of the database server events to correlate the application context information to the database context information to facilitate presentation of a view of a profile of the application and the database during the profiling session; and
   at least one processor configured to execute one or more of the context component or the analyzer component.

2. The system of claim 1, wherein the view of the profile is presented via the application.

3. The system of claim 1, further comprising:
   a binary instrumentation module configured to instrument binary code of the application by injecting code into the application, the instrumented binary code emitting application events based on application activity, wherein the analyzer component is further configured to correlate the application context information to the database context information using the application events emitted by the instrumented binary code of the application.

4. The system of claim 1, further comprising a presentation component configured to present a single view of the profile of the application and the database for each statement issued by the application.

5. The system of claim 1, wherein the application context information includes an application trace and the analyzer component is further configured to output a schematized view of the application trace, the schematized view reflecting both the application context information and the database context information.

6. The system of claim 1, further comprising a query component configured to provide browse, summarize and drill-down functionality on the view of the profile.

7. A method comprising:
   obtaining, during a profiling session:
      application context information of an application, the application context information including data access events reflecting data access application programming interface (API) calls by the application to access a database, and
      database context information of the database, the database context information including database server events exposed for profiling by a database server, the database server events reflecting execution of queries by the database server responsive to the data access API calls by the application;
   matching strings of the data access events to other strings of the database server events;
   correlating the application context information to the database context information based on the matching to obtain correlated context information; and
   based on the correlated context information, suggesting a query hint to the database that causes a query optimizer to reduce an estimated time of execution of an individual query,
   wherein at least the correlating is performed by a processor.

8. The method according to claim 7, wherein the correlating further comprises:
   matching individual data access events and individual database server events using a client process identification.

9. The method according to claim 8, wherein the matching the strings is performed for SQL statements issued in a single client process having multiple different threads.

10. The method according to claim 7, wherein the correlating further comprises:
    identifying individual data access events that precede corresponding database server events using timestamps.

11. The method according to claim 7, wherein the matching is not exact.

12. The method according to claim 7, wherein the correlated context information comprises a view having rows that reflect both the application context information and the database context information.

13. One or more computer-readable memory devices or storage devices comprising processor-executable instructions which, when executed by one or more processors, cause the one or more processors to perform acts comprising:
    obtaining:

application context information of an application, the application context information including data access events reflecting calls by the application to access a database, and database context information of the database, the database context information including database events reflecting execution of queries by a database server responsive to the calls by the application;

matching strings of the data access events to other strings of the database events; and correlating the application context information to the database context information based on the matching, wherein the data access events comprise an individual event indicating the application consumed a row from a result set of a query submitted to the database by the application.

14. The one or more computer-readable memory devices or storage devices of claim 13, the database events comprising another individual event indicating completion of a structured query language (SQL) statement.

15. The one or more computer-readable memory devices or storage devices of claim 13, the database events comprising another individual event indicating a deadlock generated by the database.

16. The one or more computer-readable memory devices or storage devices of claim 13, the data access events comprising another individual event indicating the application opened a connection to the database.

17. The one or more computer-readable memory devices or storage devices of claim 13, the acts further comprising injecting code into the application.

18. The one or more computer-readable memory devices or storage devices of claim 17, wherein the injected code emits events including at least:
an identifier of a function,
a timestamp of entry to the function, and
a timestamp of exit from the function.

19. A method comprising:
obtaining, during a profiling session:
application context information of an application, the application context information including data access events reflecting data access application programming interface (API) calls by the application to access a database, and database context information of the database, the database context information including database server events exposed for profiling by a database server, the database server events reflecting execution of queries by the database server responsive to the data access API calls by the application;

matching strings of the data access events to other strings of the database server events;

correlating the application context information to the database context information based on the matching to obtain correlated context information; and based on the correlated context information, suggesting an appropriate individual data access API according to a best practice, wherein at least the correlating is performed by a processor.

20. The method according to claim 19, wherein the individual data access API is used to pass parameters when using a stored procedure.

* * * * *